United States Patent [19]

Dixon

[11] 3,998,500
[45] Dec. 21, 1976

[54] MOUNTABLE CONE SUB ASSEMBLY
[75] Inventor: Robert L. Dixon, Brea, Calif.
[73] Assignee: Smith International, Inc., Newport Beach, Calif.
[22] Filed: Aug. 28, 1975
[21] Appl. No.: 608,648
[52] U.S. Cl. .............................. 308/8.2; 175/337
[51] Int. Cl.² .................................... F16C 19/00
[58] Field of Search .......... 175/337, 339, 372, 374; 252/26; 308/8.2

[56] References Cited
UNITED STATES PATENTS

| | | | |
|---|---|---|---|
| 2,787,502 | 4/1957 | Huckshold | 308/8.2 |
| 3,572,853 | 3/1971 | Coski | 308/8.2 |
| 3,784,264 | 1/1974 | Jackson, Jr. | 308/8.2 |

Primary Examiner—Philip Goodman
Assistant Examiner—Richard A. Bertsch
Attorney, Agent, or Firm—Allan D. Mockabee

[57] ABSTRACT

A drill bit construction of the rotary cutter type in which cutter journals extend downwardly from the bit body and toward each other at an angle, the provision of bearing sleeves removably mounted on the journals and rotary cutters removably and rotatably mounted on the bearing sleeves, permitting the replacement of the bearing sleeves or the customary roller or ballbearings and also permitting replacement of the rotary cutter itself if the latter has become worn or damaged.

7 Claims, 4 Drawing Figures

MOUNTABLE CONE SUB ASSEMBLY

Rock bits such as are presently use for drilling oil wells and for other purposes customarily include a rotary bit body upon which are mounted two or more cone cutters which rotate relative to the bit body on journals or journal legs extending downwardly and inwardly toward each other. The cutters rotate on one or more sets of roller bearings and a set of ball bearings or upon a journal bearing surface and a set of ball bearings interposed between the inside of the cone and the outside of the journal leg. The cutters lie quite close to each other so that if a cutter must be replaced because of (1) broken or worn teeth or hardened inserts (2) damaged or worn bearings or seals, the cutter cannot be removed axially from the journal legs because of their proximity to adjacent cone cutters.

One manner of manufacturing drill bits to provide for ease of assembly and disassembly is to make the bit body in sections, one each for every journal and rotary cutter.

The present invention has an object the provision of a drill bit structure wherein, in one instance, the cutter can be released relative to the journal and removed with a tilting action to clear the adjacent cutters on adjacent journals or to provide a cutter which is removable axially of the journal leg, the base of the latter being separately removable from the bit body. In both constructions, however, there are a number of common features of construction and detachable mounting of a bearing sleeve on the journal and a rotary cutter on the bearing sleeve.

With the structure of the invention it is possible to replace a single cone cutter or, if the occasion requires it, to replace a single bearing sleeve without disturbing the rotary cutters adjacent the cutter mounted on the particular bearing sleeve.

The above and other objects of the invention will more fully appear from the following description in connection with the accompanying drawings.

Figure 1:
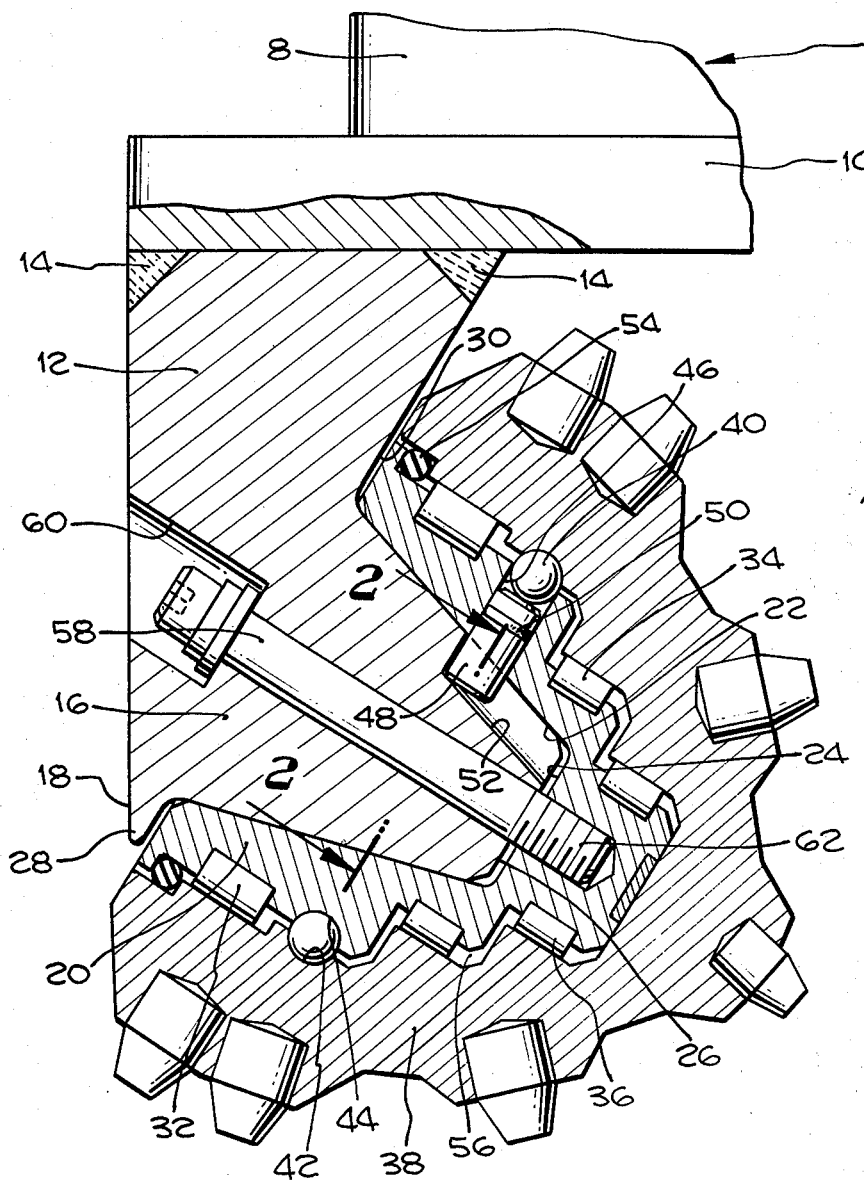
FIG. 1 is a vertical sectional view through an embodiment of the invention showing it mounted on the lower portion of a bit body.
Figure 2:
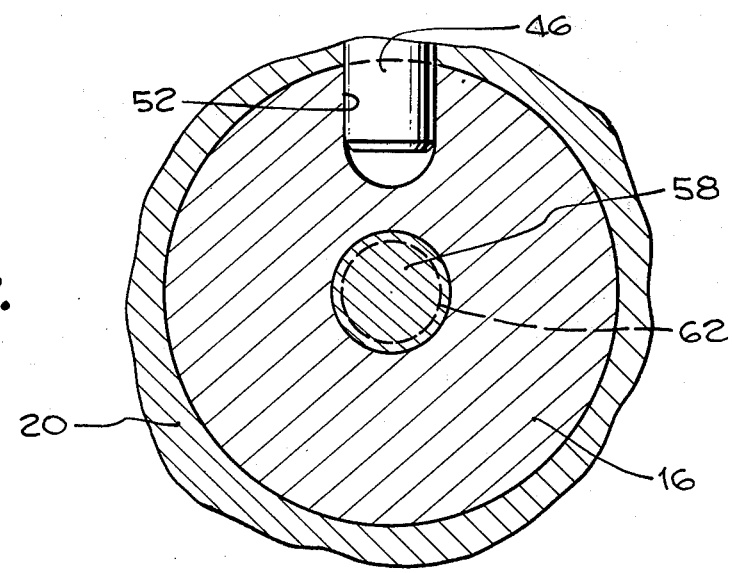
FIG. 2 is an enlarged sectional view taken approximately on the line 2—2 of FIG. 1.

In FIG. 1 there is shown a bit body indicated generally at 6. It includes a main body portion 8 which preferably is cylindrical and at its upper end is fitted into a grooved or threaded socket in a bit sub or flanged in a manner well known in the art and for that reason not shown herein. The bottom of the bit body includes a disc 10 which, as illustrated, extends outwardly from the main body portion 8.

Welded to the underside of the body disc 10 is a journal base 12 secured by welds 14. Extending downwardly and inwardly from the lower portion of the journal base 12 is a journal leg 16 and the lower and outer extremity of the base 12 terminates in a shirttail 18.

As illustrated in FIG. 1 the journal leg 16 tapers downwardly and inwardly from the inner side of the base 12 and comprises the frustum of a cone, the smaller end being the inner free end as shown. Mounted thereon is a bearing sleeve 20 having an inner wall 22 which is tapered to conform to the angle of taper of the journal leg 16. The inner end 24 of the journal sleeve is closed and it is spaced from the free end 26 of the journal leg 16.

Around the larger diameter open end of the bearing sleeve 20 is a shoulder surface 28 which is spaced from the surface 30 on the base 12.

Sets of roller bearings 32, 34 and 36 are interposed between inner side wall portions of a cone cutter 38 and outer wall portions of the bearing sleeve 20. Such roller bearing sets are often used between the inside of rotary cutters and the outer wall surfaces of leg journals, and they serve the same antifriction purpose when interposed between the presently illustrated rotary cutters and the bearing sleeve 20.

There is also illustrated a set of ball bearings 40 in raceways 42 and 44 in the cutter 38 and bearing sleeve 20 respectively. It is also customary to use ball bearings between the rotary cutters and the journal legs of conventional cutters, either in conjunction with one or more sets of roller bearings, or, as is the case in what is termed a friction bit, wherein there is a set of ball bearings and where portions of the inner wall of the cutter utilizes opposed portions of the journal leg as bearing surfaces.

The bearing balls 40 are assembled in the bearing raceways 42, 44 through a bore 46 which extends from the inner wall of the bearing sleeve 20 to communicate with said raceways. Before the bearing sleeve 20 is mounted on the leg journal 16, the balls are introduced through the part 46 to lie in the raceways of the said bearing sleeve and the rotary cutter 38.

The bore 46 through which the balls 40 were inserted is closed by a ball plug 48 which may conveniently have an O-ring seal 50. The ball plug is of such length that its outer end will lie approximately at the bottom of the raceway 44 in the bearing sleeve 20 and the inner end of the said ball plug will extend inwardly beyond the inner wall of the bearing sleeve. To accommodate the inwardly extending portion of ball plug 48 when the bearing sleeve is mounted on the leg journal 16 ther is provided a slot 52 from the inner end of the leg journal 16.

About the larger outer end portion of the bearing sleeve 20 and between it and the inside outer end portion of the rotary cutter 38 is an O-ring seal 54 which is adapted to close a lubrication space 56 between the bearing sleeve and the cutter.

When the rotary cutter 38 is mounted on the bearing sleeve 20 and the latter is positioned as illustrated on the leg journal 16, the bearing sleeve is secured in position by a bolt 58 which lies longitudinally of the leg journal 16 and approximately axially thereof. The bolt is inserted through the leg journal from an enlarged socket 60 in the shirttail portion of the journal base 12. The inner end of the bolt extends beyond the free end of the journal leg 16 and is threaded into the closed end 24 of the bearing sleeve 16, the threaded portion of the bolt being indicated at 62.

In a conventional drill bit the two or more cutters usually provided are rather closely spaced so that it is impossible to remove one cutter axially from its journal leg because of the proximity of the adjacent cutter. However, with the construction of FIG. 1, when the bolt 58 is removed from the bearing sleeve 20, the bearing sleeve and cutter 38, as a unit, can be moved a short distance downwardly and inwardly relative to the journal leg and then tilted in a clockwise direction as viewed in FIG. 1, so that it can be removed without encountering adjacent cutters. Then the ball plug 48 can be removed along with the bearing balls 40 and the bearing sleeve 20 and cutter 38 can be separated. This will permit the substitution of a new cutter 38 or a new bearing sleeve 20 or both, depending upon whether one or both of these elements is worn and needs replacement.

The construction provides for the rehabilitation of one cutter assembly without disturbing the others and without requiring the entire body 6 of the drill bit be made in separate pieces, one for each cutter assembly as presently is being done.

Figure 3:
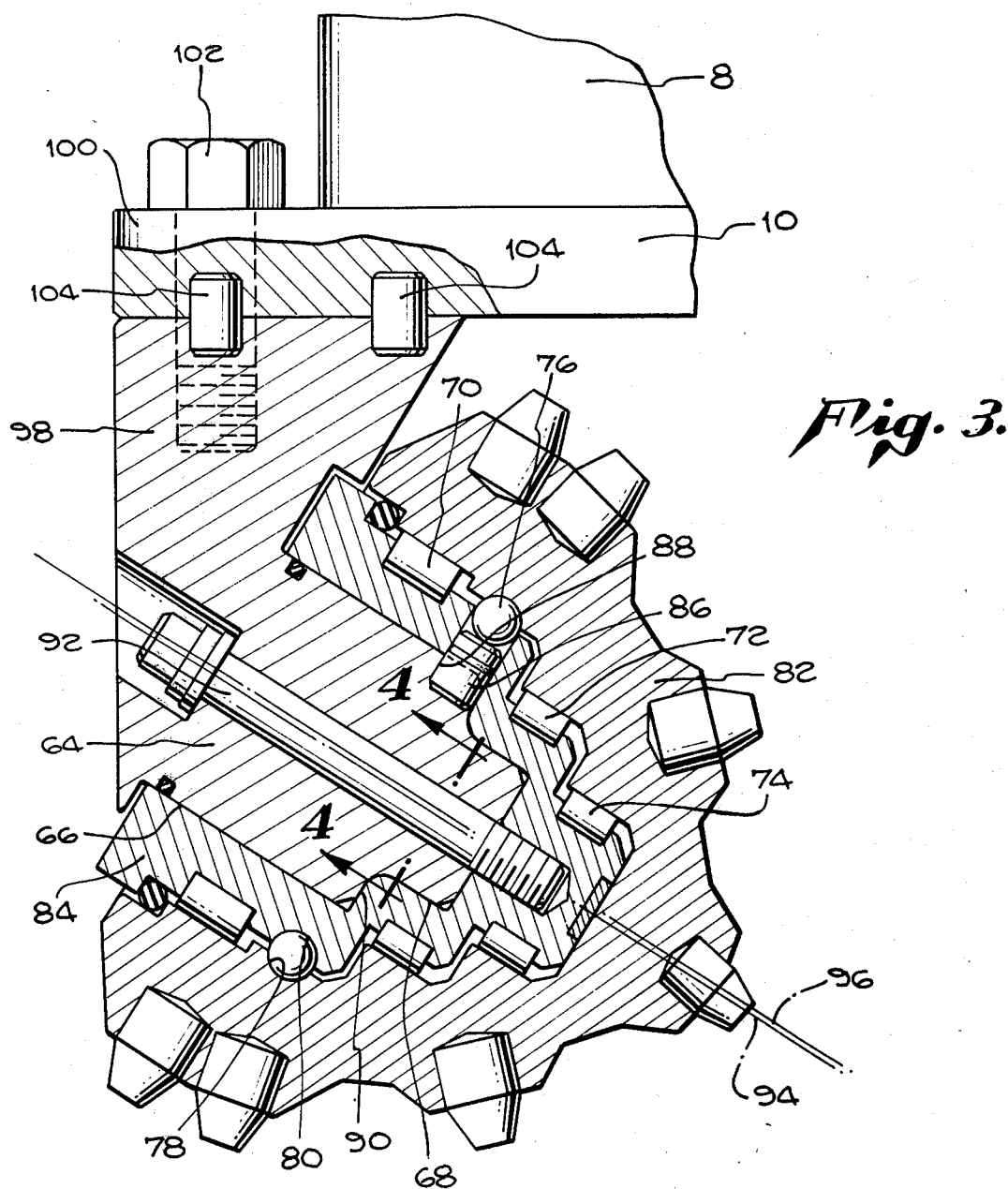
FIG. 3 is a vertical sectional view through another form of the invention.
Figure 4:
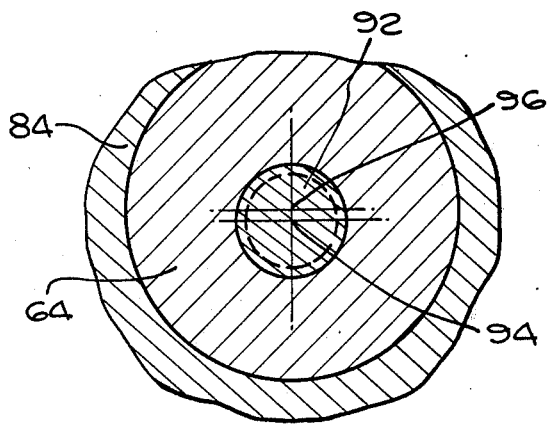
FIG. 4 is a section taken approximately on the line 4—4 of FIG. 3.

In FIG. 3 there is shown an embodiment wherein the journal leg 64 has circumferential cylindrical wall portions 66 and 68 as distinguished from the tapered or frustoconical shape of the journal leg in FIG. 1. It is similar in many other respects in that it is provided with roller bearing assemblies 70, 72 and 74 and a set of ball bearings 76 in complementary raceways 78 and 80 in the rotary cutter 82 and bearing sleeve 84. There is also a ball plug 86 similar to the ball plug 48 of the first embodiment and it is accommodated in assembling the tool by a slot 88 formed inwardly from an axially facing surface 90 on the leg journal 64. This slot 88 has a function corresponding to that of the slot 52 of the first embodiment. There is also a bolt 92 similar to the bolt 58 in FIG. 1. However, there is one difference. In FIG. 3 the bolt may have its axial center line 94 slightly offset from the line 96 which is the true central axis of rotation of the leg journal 64 and the bearing sleeve 84. The slight offset of the axis of the bolt 92 assists in securing the bearing sleeve 84 against rotation relative to the leg journal 64.

The journal base 98 is not welded to the drill body flange 100 as in the previous embodiment. Instead it is secured by one or more bolts 102 which extend through the bit body flange 100 into each of the journal bases 98, generally three in number. Because of the tremendous torque to which tools of this type are subjected it is preferred that locking plugs 104 be inserted between the bit body flange 100 and the journal base 98 to prevent the retaining bolts 102 from shearing under such torque. These locking plugs plus the bolts provide at least equally as strong anchoring means as the welds 14 in the previous embodiment. The locking plugs insure the cutter is in proper position both radially and axially with the bit center.

Rather than removing the bearing sleeve 84 and rotary cutter 82 from the journal leg 64 by tilting as in the previous embodiment the entire assembly of journal base 98 with its leg 64, the bearing sleeve 84 and rotary cutter 82, are removed by removing the retaining bolts 102. Then, of course, the bearing sleeve and rotary cutter can readily be dismantled after removal of the bolt 92 which connects the bearing sleeve to the journal leg 64.

It will be seen that I have provided a drill bit which includes two or more, preferably three, rotary cutters in close proximity wherein one cutter assembly can be removed from the drilling tool in a convenient manner without obstruction by the adjacent cutters. It is a type of construction which permits such selective removal of cutter assemblies without requiring that the entire tool body be provided with a separable section for each cutter assembly. It permits also the selective replacement of a rotary cutter or bearing sleeve, or both, thus considerably extending drill bit life. Furthermore, by eliminating the necessity for providing a sectional bit body, the cost of producing complete drill bits can be considerably reduced. It is a type of tool which from an economic standpoint can compete favorably with three cone rock bits of 20 inches in diameter and larger and in construction drill bits with demountable two cone flat bottom bits. As related to the larger three cone bits they can be replaced on the job site, whereas the large conventional three cone bit is not thus replaceable and total bit life is shortened. Since the bits of the invention can be rebuilt in the field with no welding or bit gaging problems, considerably economy is achieved.

The bodies of flat bottomed bits such as utilized herein have virtually unlimited life because of the ready replacement and rebuilding of the cutter assemblies. Furthermore, with the bolted type of journal leg base such as illustrated in FIG. 3, the flat bottomed bits including the main body portion 8 and bottom disc 10 can be conveniently converted to accommodate different types of teeth and cutters.

It should be understood that various changes can be made in the form, details, arrangement and proportions of the various parts without departing from the spirit of the invention.

What is claimed is:

1. In a drilling tool, a body portion having a longitudinal axis,
    a journal including a base carried by said body,
    the journal extending downwardly and inwardly toward said longitudinal axis,
    a sleeve-like bearing member on said journal,
    means detachably securing said bearing member on said journal against axial displacement,
    a cutter rotatably mounted on said sleeve-like bearing member,
    and means interconnecting said cutter and said sleeve-like bearing member to secure the cutter against axial displacement from said bearing member.

2. The structure in claim 1 and said journal having an inner free end,
    said sleeve-like bearing member having a closed end at the free end of the journal,
    and a bolt extending longitudinally of the journal from the free end thereof and threaded into the closed end of said sleeve-like bearing member.

3. The structure in claim 1, and said means interconnecting said cutter and said sleeve-like bearing member to secure the cutter against axial displacement comprising complementary ball raceways in said sleeve-like bearing member and said cutter,
    bearing balls in said raceways,
    the sleeve-like bearing member having a ball insert bore entrant from the inner wall thereof and terminating in the raceway portion of the bearing member,
    the journal having a longitudinal slot therein from an end portion thereof and terminating at said bore,
    and a ball plug in said bore with its outer end positioned to confine said balls in said raceways and its inner end in said slot.

4. The structure in claim 1, and said journal base having a shirttail portion,
    said journal extending downwardly and inwardly from said shirttail portion and terminating in the inner free end,
    said sleeve-like bearing member having a closed end at the inner free end of the journal, and a securing bolt extending longitudinally through said journal from said shirttail portion and threaded into the closed end of said sleeve-like bearing.

5. The structure in claim 1, and said journal having a side wall tapering from a larger diameter adjacent said body to a smaller diameter at the free inner end of the journal,
and the sleeve-like bearing member having an inner wall tapering to conform to the side wall of said journal.

6. The structure in claim 1, and said journal having a cylindrical outer surface.

7. The structure in claim 1 and said journal having an inner free end,
said sleeve-like bearing member having a closed end at the free end of the journal,
and an annular seal between the outer circumferential end portion of the sleeve-like bearing member and an inner circumferential end portion of the rotary cutter remote from the closed end of the sleeve-like member.

* * * * *